United States Patent
Lee et al.

(10) Patent No.: US 10,541,059 B2
(45) Date of Patent: Jan. 21, 2020

(54) DIGITAL PROTECTION SYSTEM FOR NUCLEAR POWER PLANT

(71) Applicant: DOOSAN HEAVY INDUSTRIES & CONSTRUCTION CO., LTD., Changwon-si, Gyeongsangnam-do (KR)

(72) Inventors: Sanghoon Lee, Yongin-si (KR); Choonyong Lee, Yongin-si (KR); Chaeho Nam, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 39 days.

(21) Appl. No.: 15/970,888

(22) Filed: May 4, 2018

(65) Prior Publication Data

US 2018/0330837 A1 Nov. 15, 2018

(30) Foreign Application Priority Data

May 15, 2017 (KR) ........................ 10-2017-0060134

(51) Int. Cl.
*G21D 3/06* (2006.01)
*G21C 7/36* (2006.01)
(Continued)

(52) U.S. Cl.
CPC ............. *G21D 3/06* (2013.01); *G05B 19/058* (2013.01); *G21C 7/36* (2013.01); *G21C 17/032* (2013.01);
(Continued)

(58) Field of Classification Search
CPC . G21D 3/06; G21D 3/001; G21D 5/08; G05B 19/058; G05B 19/0428;
(Continued)

(56) References Cited

U.S. PATENT DOCUMENTS 6,049,578 A    4/2000  Senecha l et al.
6,292,523 B1 *  9/2001  Senechal .................. G05B 9/03
                                                  376/259
(Continued)

FOREIGN PATENT DOCUMENTS

KR  10-2001-0013440 A   2/2001
KR  10-2008-0051417 A   6/2008
(Continued)

OTHER PUBLICATIONS

A Korean Office Action dated Dec. 19, 2018 in connection with Korean Patent Application No. 10-2017-0060134 which corresponds to the above-referenced U.S. application.

*Primary Examiner* — Lily C Garner
(74) *Attorney, Agent, or Firm* — Invenstone Patent, LLC

(57) ABSTRACT

A digital protection system includes a process protection system having at least two channels and a reactor protection system having at least two trains. The process protection system includes, in one channel, first and second comparative logic controllers of different types that are mutually independent of each other and that respectively receive process variables as inputs and each outputting comparison logic results. The reactor protection system includes, in one train, first and second concurrent logic controllers of different types that are mutually independent from each other and that respectively receive the comparison logic results as inputs and each outputting concurrent logic results. The reactor protection system includes initiation circuits, each circuit including a plurality of relays connected in series and a plurality of relays connected in parallel. One series-connected relay is controlled by one of the two different concurrent logic results, and one parallel-connected relay is controlled by the other.

20 Claims, 19 Drawing Sheets

(51) Int. Cl.
*G21C 17/032* (2006.01)
*G21D 5/08* (2006.01)
*G05B 19/05* (2006.01)
*G21D 3/00* (2006.01)

(52) U.S. Cl.
CPC .............. *G21D 3/001* (2013.01); *G21D 5/08* (2013.01); *G05B 2219/14006* (2013.01); *G05B 2219/14124* (2013.01)

(58) Field of Classification Search
CPC ........... G05B 2219/14006; G05B 2219/14124; G05B 9/03; G21C 7/36
See application file for complete search history.

(56) References Cited

U.S. PATENT DOCUMENTS

| | | | |
|---|---|---|---|
| 6,484,126 B1 * | 11/2002 | Brown, Sr. ............. | G05B 9/03 |
| | | | 702/184 |
| 9,997,265 B2 | 6/2018 | Remley et al. | |
| 2004/0136487 A1 * | 7/2004 | Shin ........................ | G21D 3/04 |
| | | | 376/259 |
| 2011/0202163 A1 | 8/2011 | Kim et al. | |
| 2018/0122524 A1 * | 5/2018 | Nam ...................... | G21D 3/001 |

FOREIGN PATENT DOCUMENTS

| | | | |
|---|---|---|---|
| KR | 20080051417 A | * | 6/2008 |
| KR | 101042030 B1 | * | 6/2011 |
| KR | 10-2016-0086082 A | | 7/2016 |
| KR | 20160086082 A | * | 7/2016 |
| KR | 101846345 B1 | * | 4/2018 |

\* cited by examiner

[Fig.1]
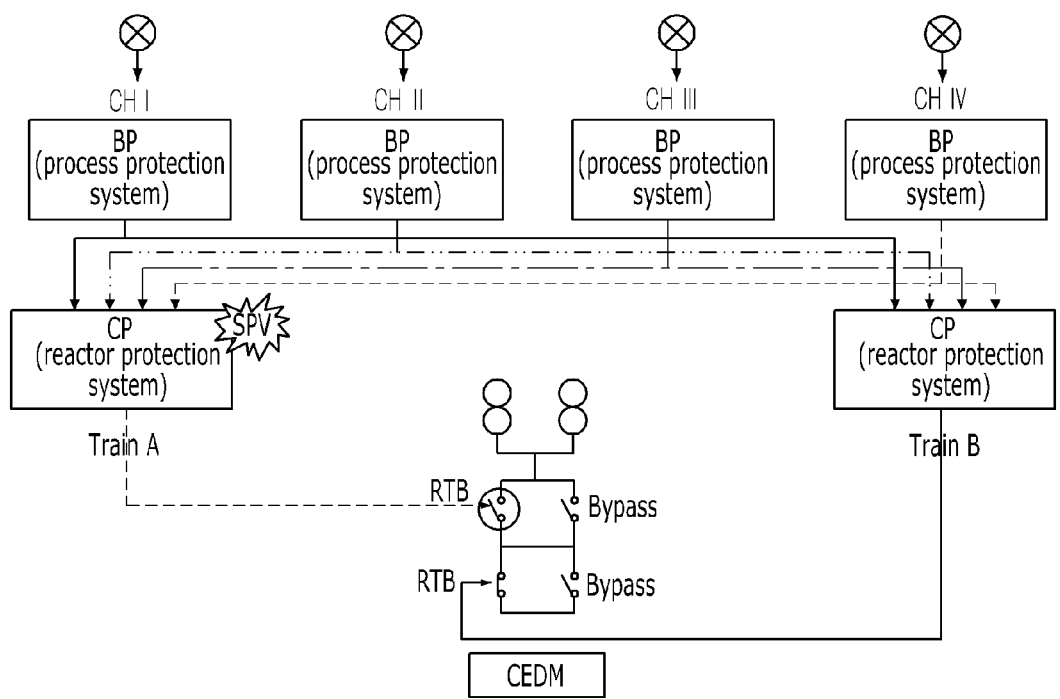
Related Art

[Fig.2]
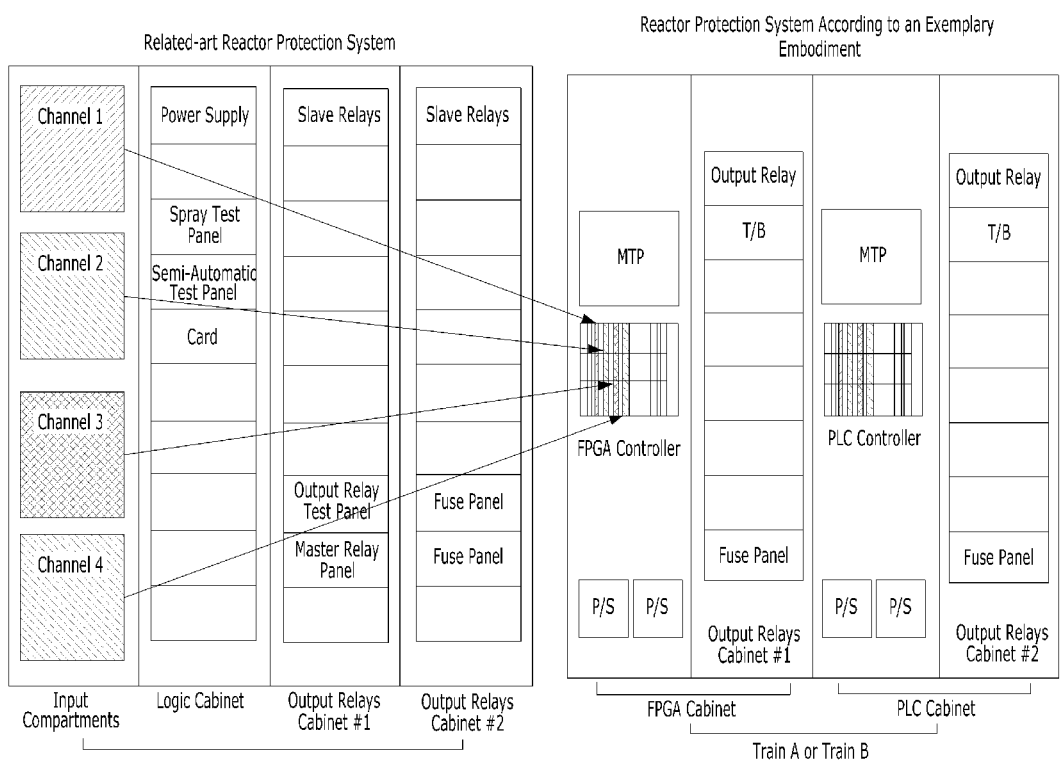

[Fig.3]
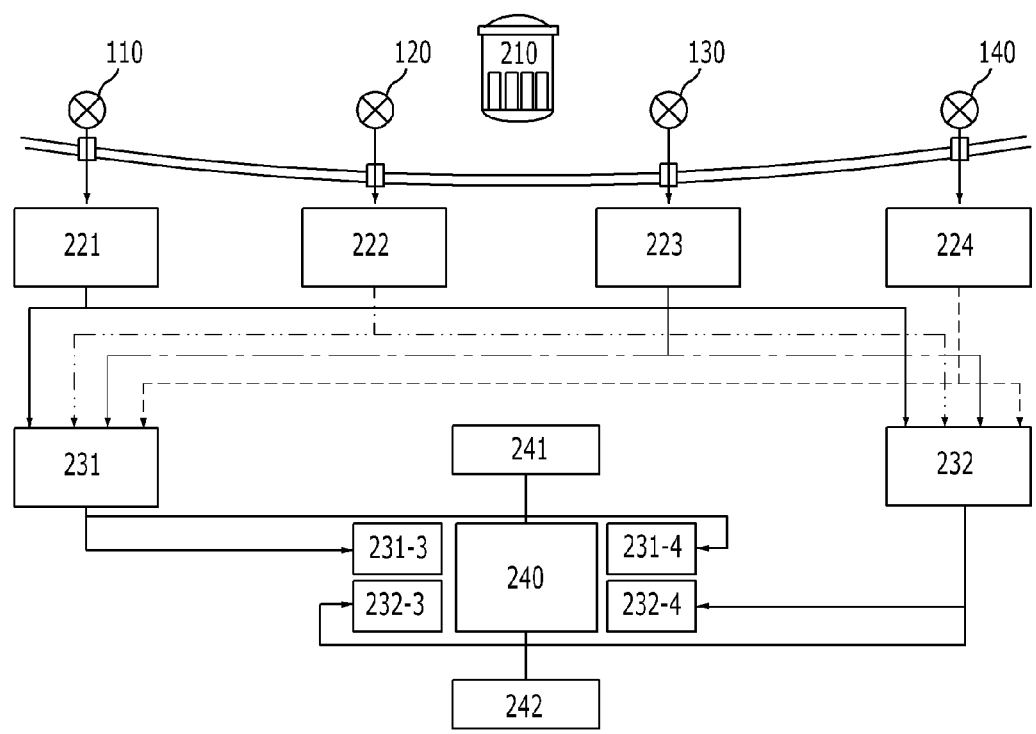

[Fig.4]
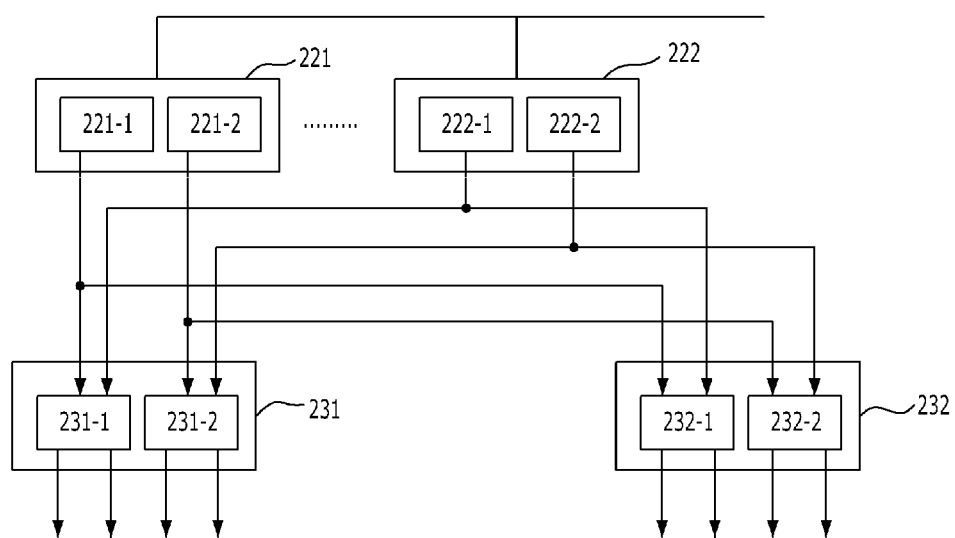

[Fig.5]
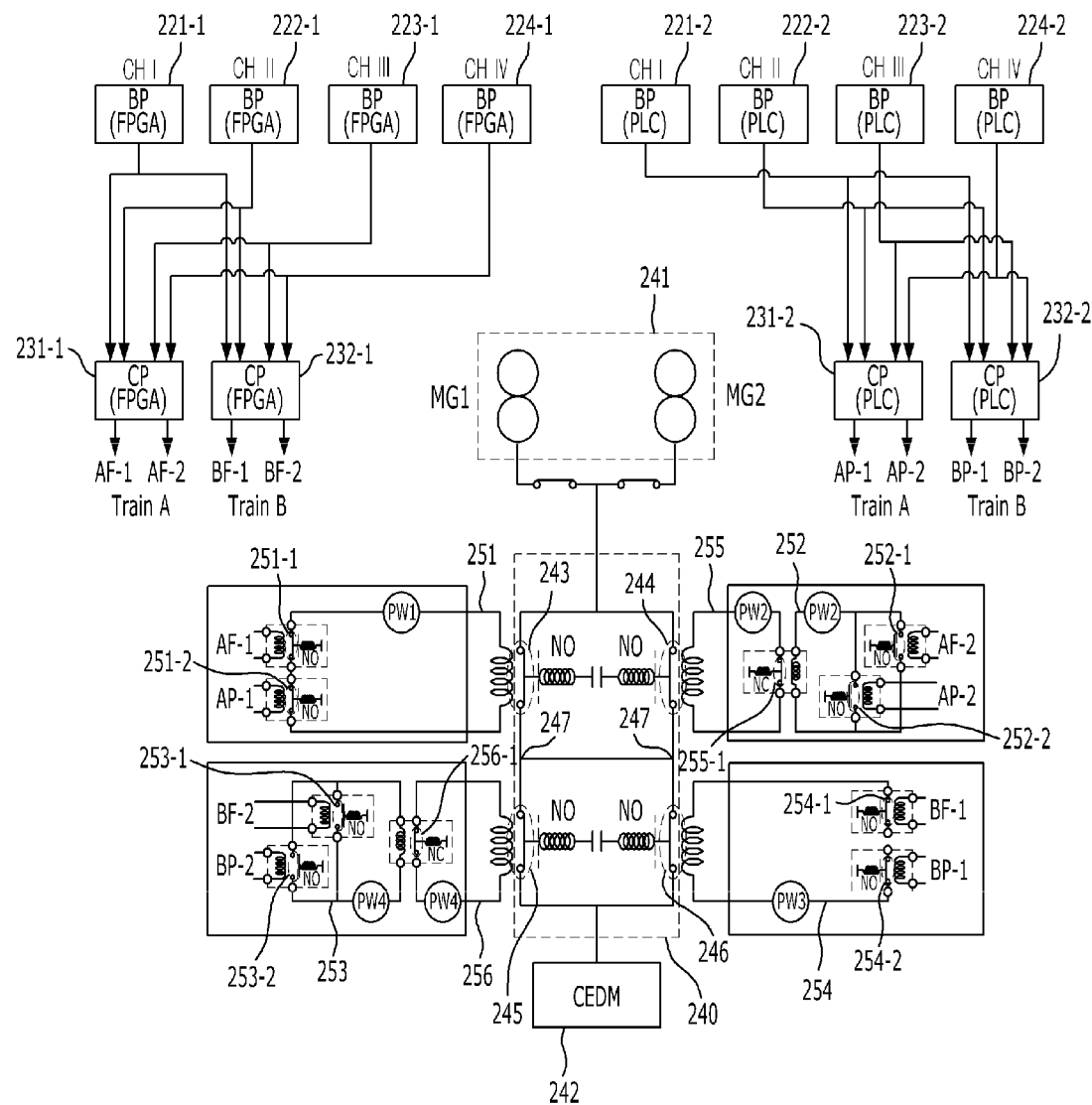

[Fig.6a]
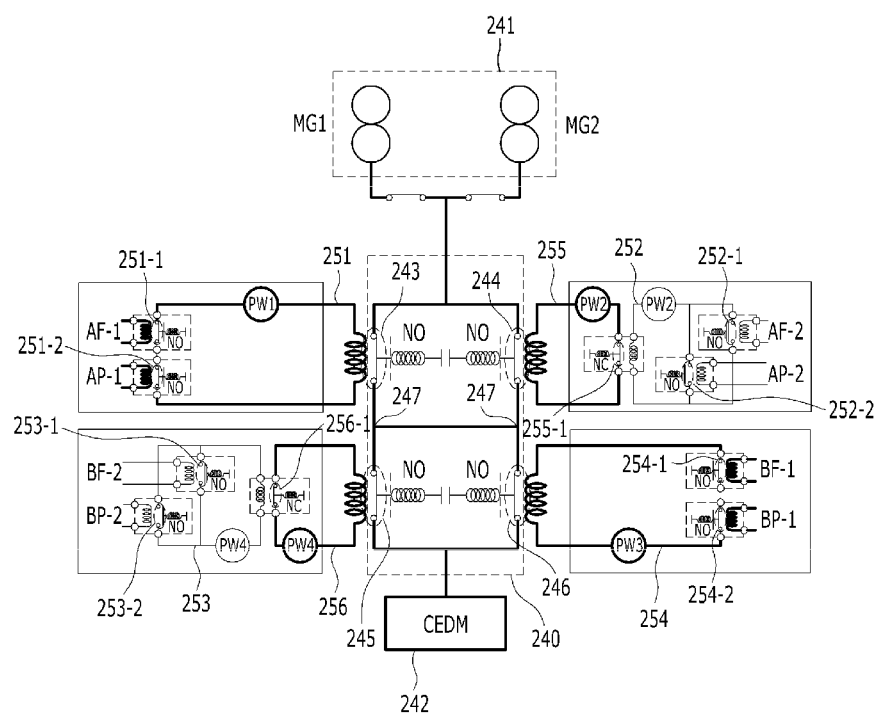

[Fig.6b]
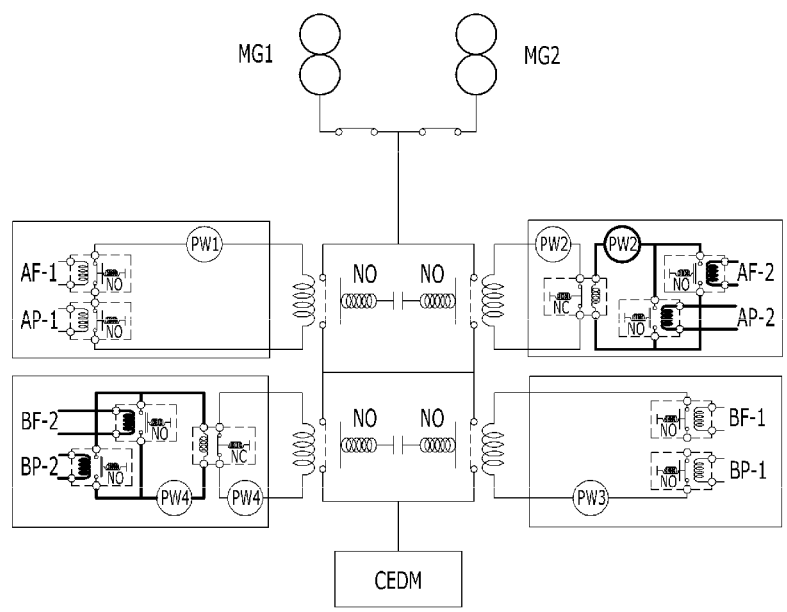

[Fig.6c]
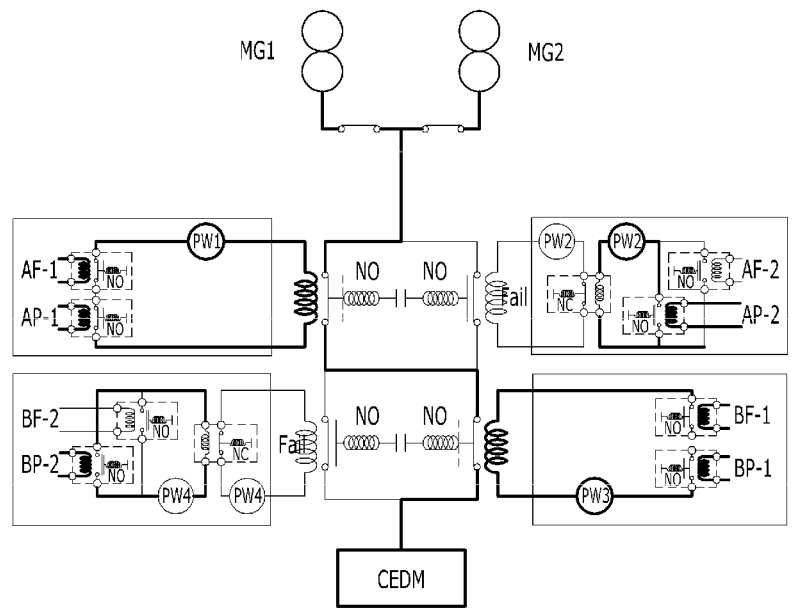

[Fig.6d]
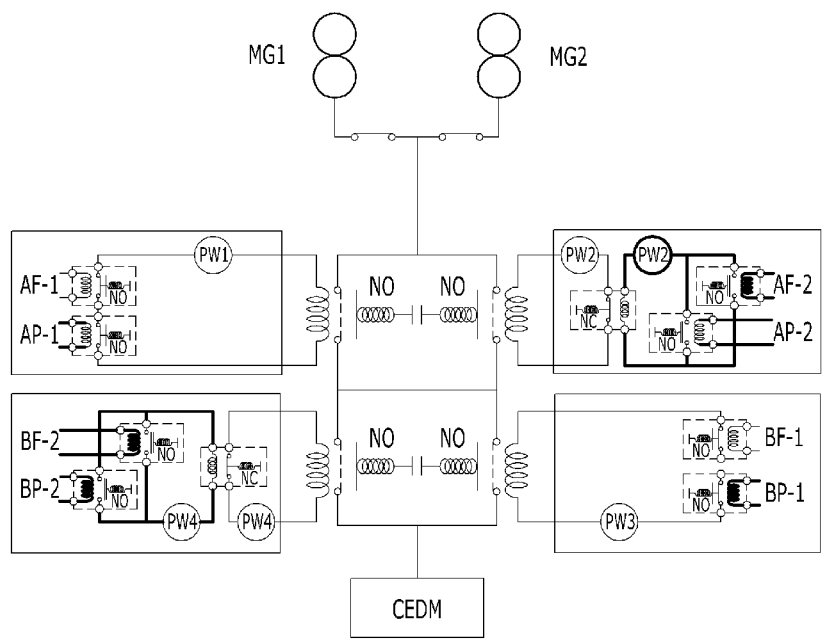

[Fig.6e]
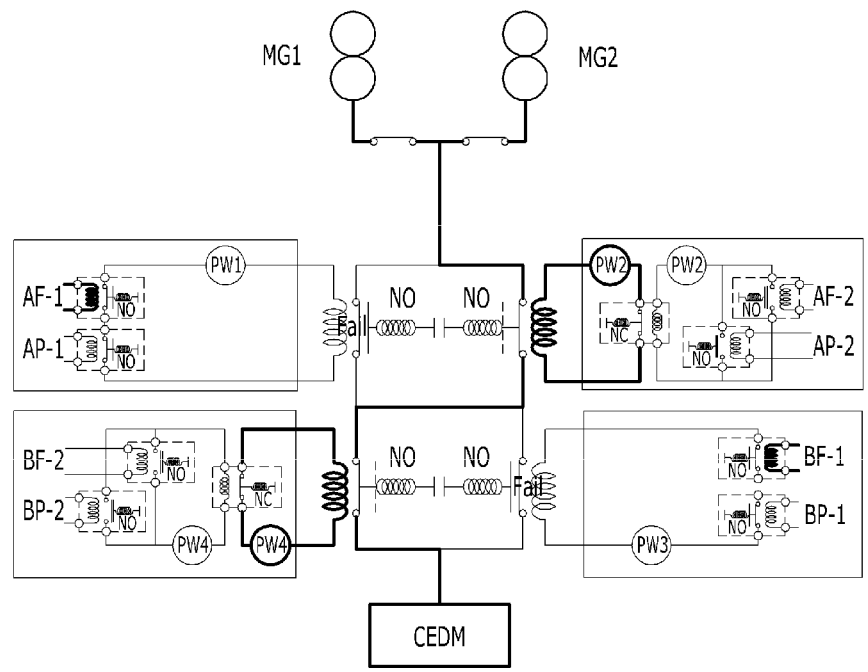

[Fig.6f]
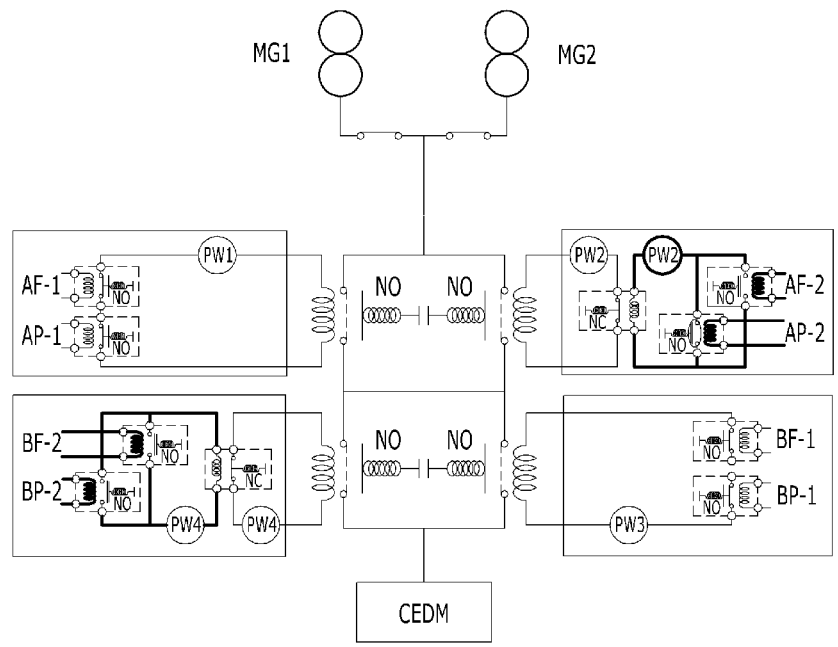

[Fig.6g]
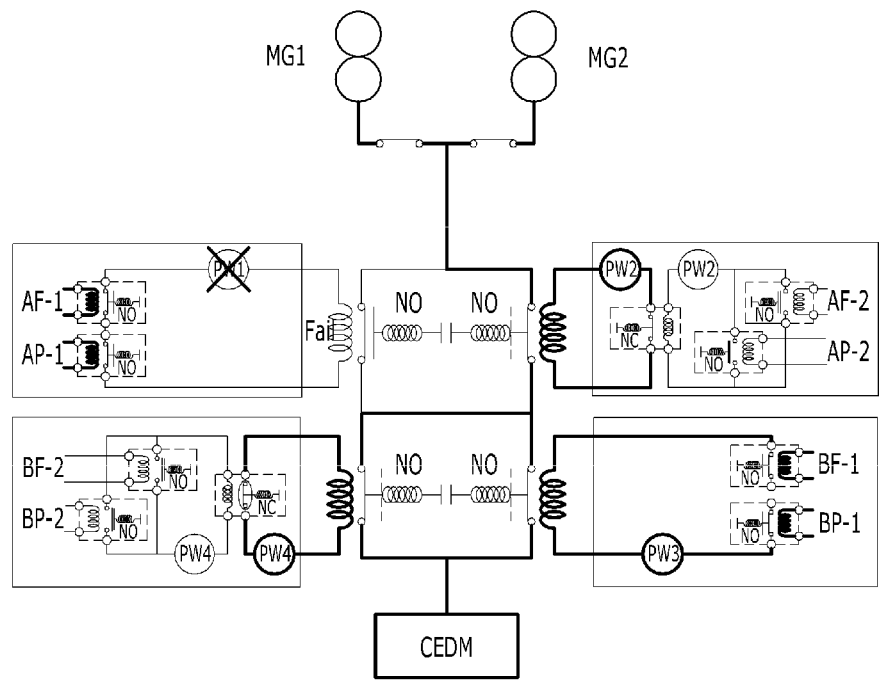

[Fig.6h]
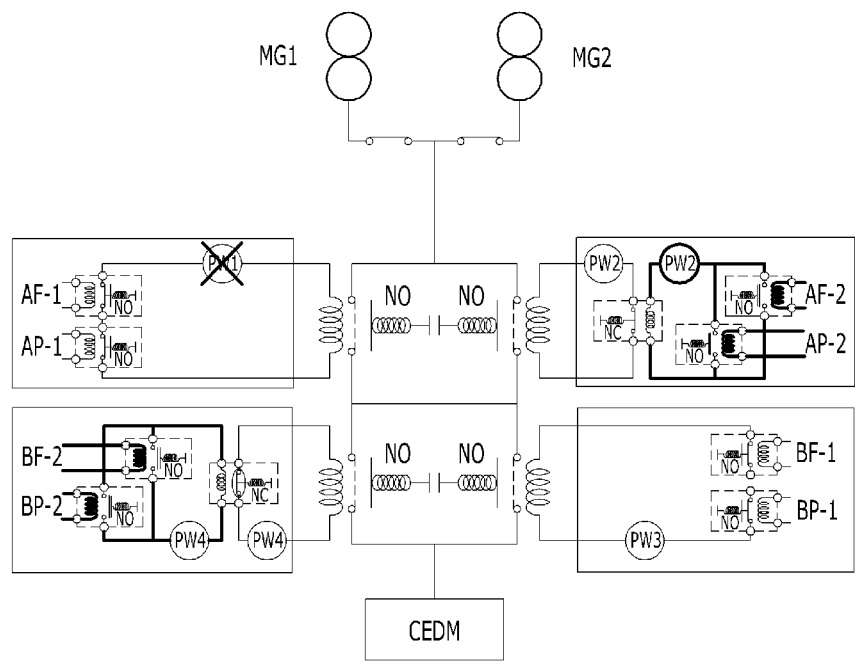

[Fig.6i]
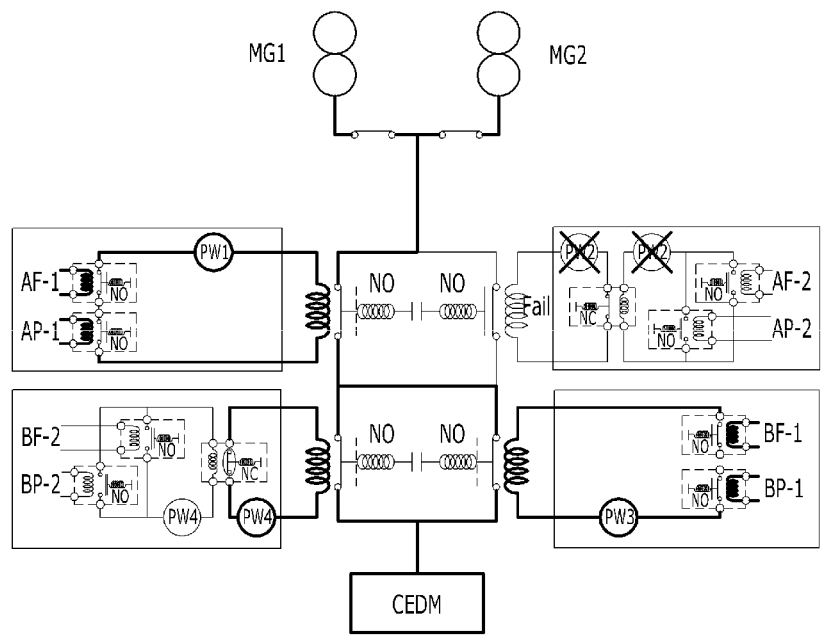

[Fig.6j]
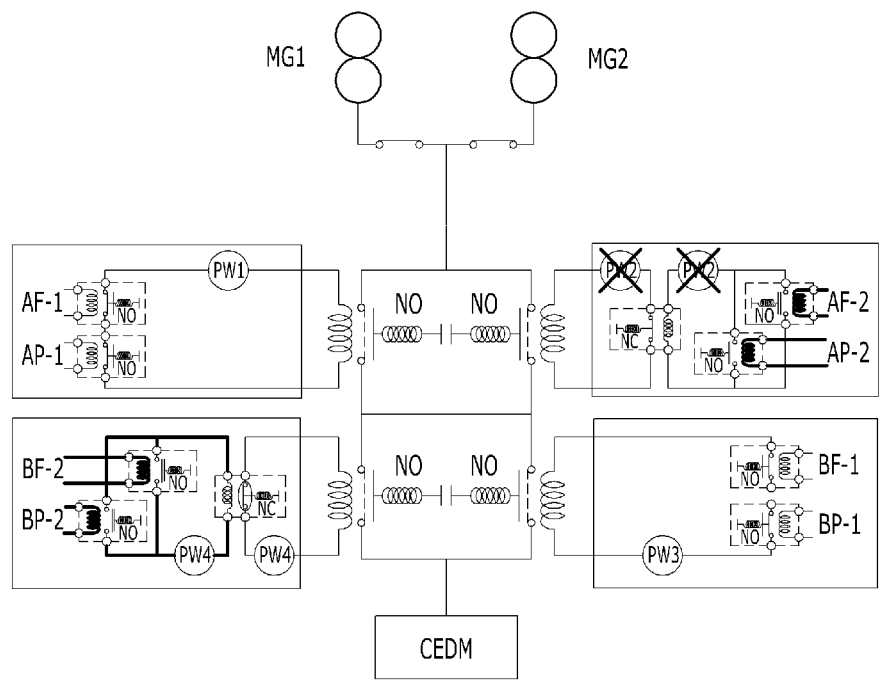

[Fig.6k]
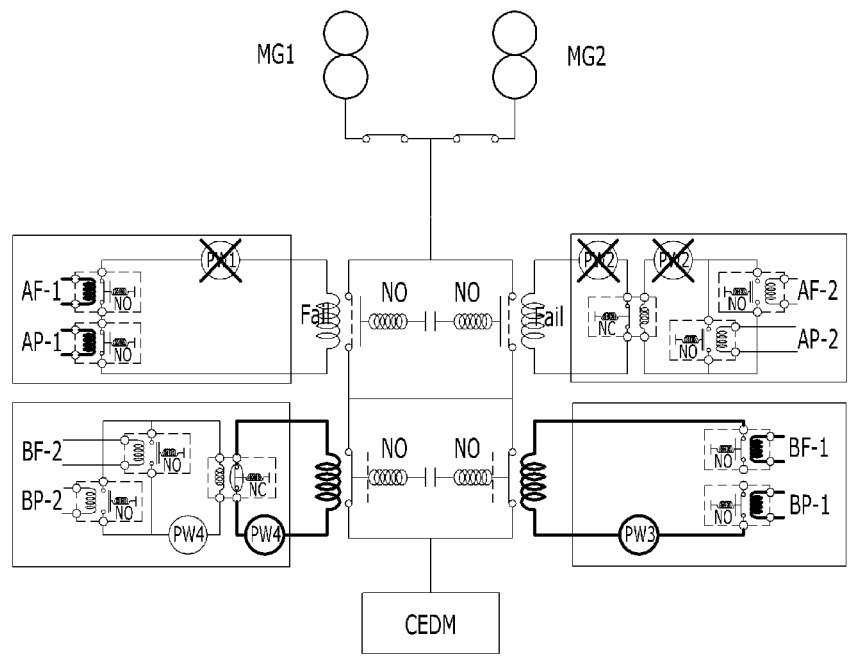

[Fig.61]
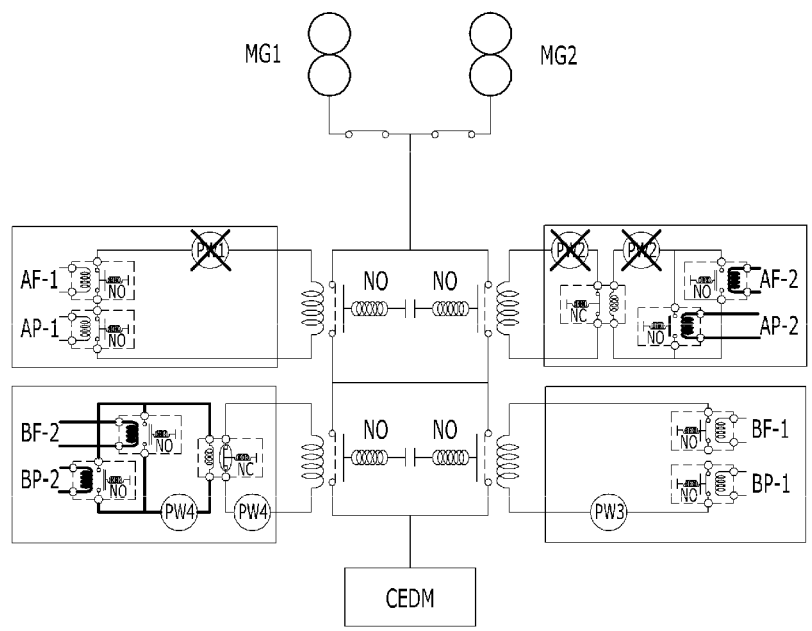

[Fig.6m]
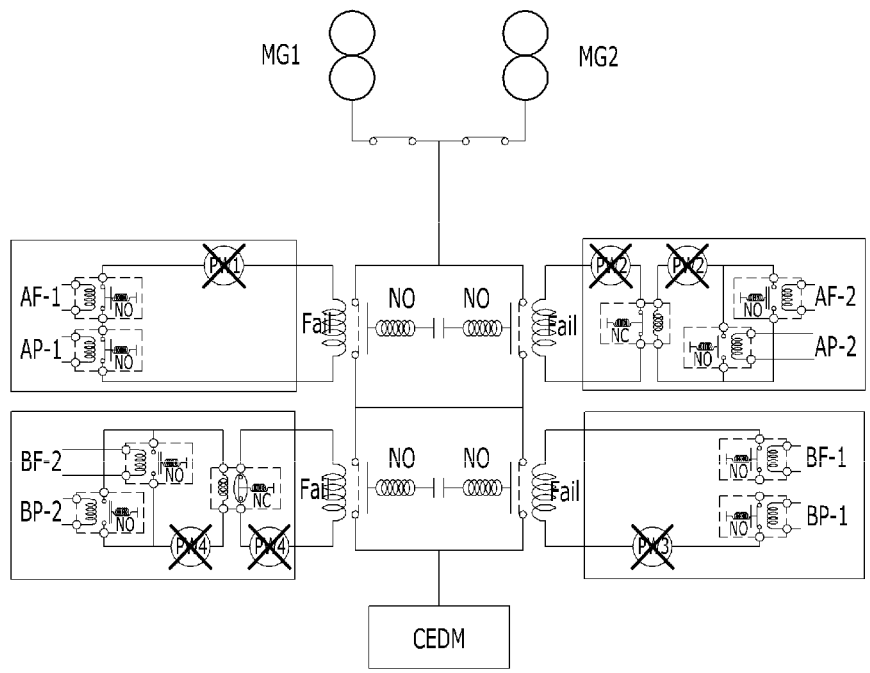

[Fig.6n]
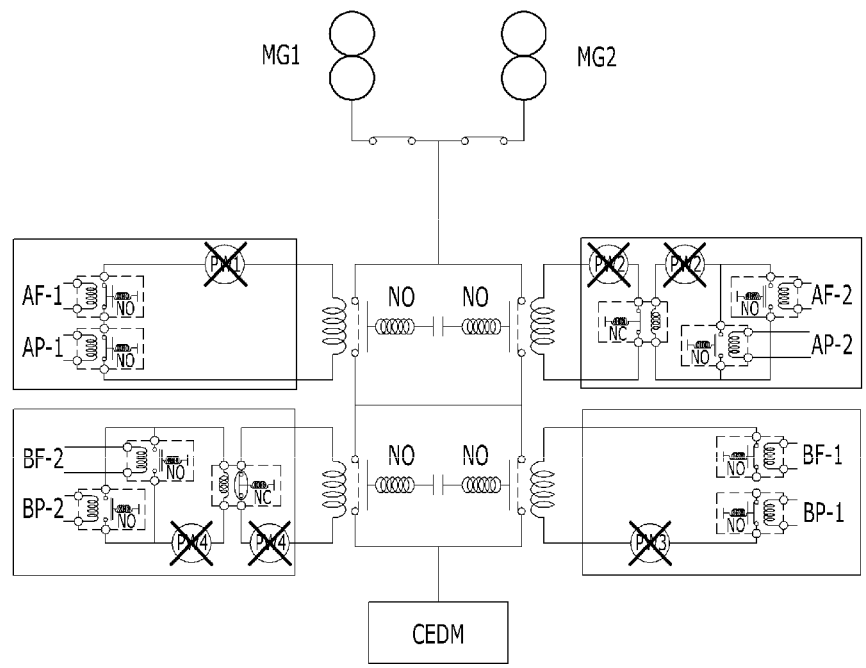

DIGITAL PROTECTION SYSTEM FOR NUCLEAR POWER PLANT

CROSS REFERENCE TO RELATED APPLICATIONS

The present application claims priority to Korean Patent Application No. 10-2017-0060134, filed May 15, 2017, the entire contents of which is incorporated herein for all purposes by this reference.

BACKGROUND OF THE INVENTION

Field of the Invention

The present invention relates generally to a technique for improving safety and reliability in a protection system, made up of a process protection system and a reactor protection system that performs safety functions of a nuclear power plant. More particularly, the present invention relates to a digital protection system for a nuclear power plant, which is capable of eliminating a single point vulnerability (SPV) and responding to a common cause failure (CCF) in an existing protection system, by applying two different and mutually independent controllers to the protection system and appropriately combining processing results of the two controllers.

Description of the Related Art

Nuclear power generation refers to generating electricity using heat energy generated by a fission chain reaction to heat steam which drives a turbine generator by boiling water. An enormous amount of power is generated as energy required to completely separate atomic nuclei into protons and neutrons which are emitted as free particles, and accordingly nuclear power generation is the most desirable power source capable for acquiring large amounts of energy using an extremely small amount of fuel. Most countries around the world produce electricity using nuclear power generation.

However, in the case of the nuclear power generation, since using nuclear energy has many risks, numerous safety devices and highly trained operators are required.

The protection system serves to monitor the status of a nuclear steam supply system (NSSS), and mitigates an effect of an accident by allowing the reactor to be shut down when a monitored process variable reaches a prescribed protection system setting.

An SPV event is a component failure resulting in a reactor or turbine shutdown due to a fault present in a single component. A number of SPVs may be present in any existing operating nuclear power plant, and the number of SPVs may reach up to 70-90 in reactor protection systems of operating nuclear power plants built in the 1980s. The SPVs are caused by various analog devices that are non-multiplexed within the reactor protection system.

A CCF event is a situation where a failure simultaneously occurs in multiple components and is due to a cause that is common to the multiple components. Performance of unique safety functions of the protection system may be seriously effected when a CCF occurs in a protection system. An example CCF that can be easily understood is the Y2K bug, or millennium bug, in 1999. This meant that, upon arrival of the year 2000, computers incapable of recognizing the year 2000 could malfunction. However, in the Y2K case, preparatory measures were taken to allow the problem to be removed in advance and finished to the point where only a few errors occurred in some fields.

SUMMARY OF THE INVENTION

It is an object of the present invention to provide a digital protection system for a nuclear power plant, including a process protection system and a reactor protection system that are constituted with concurrent logic controllers and comparative logic controllers of different (contrasting) types from each other, in order to address problems of being vulnerable to the SPV and the CCF that may occur in existing protection systems of nuclear power plants.

It is another object of the present invention to provide a digital protection system for a nuclear power plant, in which safety is improved through an improvement of a reactor shutdown function.

It is another object of the present invention to provide a digital protection system for a nuclear power plant, in which reliability is improved through an elimination of component failure resulting in reactor failure due to a single fault.

The technical problem to be solved by the present invention is not limited to the above-mentioned technical problems, and various technical problems can be included within the scope of what will be apparent to the ordinarily skilled person in the art from the following description.

According to an aspect of the present invention, there is provided a digital protection system having at least two channels and at least two trains and may include a process protection system and a reactor protection system. The process protection system may have, in one channel, first and second comparative logic controllers of different types that are mutually independent of each other, the first and second comparative logic controllers each receiving process variables as inputs and each outputting comparison logic results. The reactor protection system may have, in one train, first and second concurrent logic controllers of different types that are mutually independent from each other, the first and second concurrent controllers each receiving the comparison logic results as inputs and each outputting concurrent logic results. The reactor protection system may include at least two initiation circuits, each initiation circuit including a series circuit in which a plurality of relays are connected in series and a parallel circuit in which a plurality of relays are connected in parallel, one of the series circuit relays being controlled by receiving one of the concurrent logic results as an input and one of the parallel circuit relays being controlled by receiving the other of the concurrent logic results as an input.

The at least two channels may include a first channel, a second channel, a third channel, and a fourth channel, and the at least two trains may include a first train and a second train.

The different types of comparative logic controllers may include an FPGA type and a PLC type. Preferably, the comparative logic controllers each transmit the comparison logic results only to concurrent logic controllers of one type.

The process variables may include information indicative of at least one of a reactor coolant hot-tube temperature, a reactor coolant cold-tube temperature, a reactor coolant flow rate, a pressurizer pressure, a pressurizer water level, a neutron flux value, a containment building pressure, a steam generator water level, a steam pipe pressure, and a refueling water tank level.

The comparison logic results may include one of a normal signal and an abnormal signal. The first concurrent logic controller may output the concurrent logic results based on the number of the comparison logic results and the number of the abnormal signals received from the first comparative logic controllers included in each channel, and the outputted concurrent logic results of the first concurrent logic controller may include a first output signal being input to one relay included in the series circuit and a second output signal being input to one relay included in the parallel circuit. The second concurrent logic controller may output the concurrent logic results based on the number of the comparison logic results and the number of the abnormal signals received from the second comparative logic controllers included in each channel, and the outputted concurrent logic results of the second comparative logic controllers may include a third output signal being input to one relay included in the series circuit and a fourth output signal being input to one relay included in the parallel circuit. Here, the first and second output signals have opposite logic values, and the third and fourth output signals have opposite logic values.

The first concurrent logic controller may output the concurrent logic results when the received comparison logic results includes at least one abnormal signal, by outputting a first logic value to the series circuit and a second logic value to the parallel circuit, and the second concurrent logic controller may output the concurrent logic results when the received comparison logic results include at least one abnormal signal, by outputting the first logic value to the series circuit and the second logic value to the parallel circuit. Meanwhile, the first concurrent logic controller may outputs the concurrent logic results when the received comparison logic results includes at least one normal signal, by outputting a first logic value to the series circuit and a second logic value to the parallel circuit, and the second concurrent logic controller may output the concurrent logic results when the received comparison logic results include at least one normal signal, by outputting the first logic value to the series circuit and the second logic value to the parallel circuit.

The digital protection system may further include an RTSS, which may include a first NO contact connected between a power supply and a central node; a second NO contact connected between the power supply and the central node; a third NO contact connected between the central node and a CEDM; and a fourth NO contact connected between the central node and the CEDM. When at least one of the first NO contact and the second NO contact is closed and at least one of the third NO contact and the fourth NO contact is closed, power may be supplied from a motor-generator set to the CEDM. On the other hand, when both the first NO contact and the second NO contact are open or both the third NO contact and the fourth NO contact are open, power supplied from a motor-generator set to the CEDM may be interrupted.

Each initiation circuit may include a first series circuit for controlling the first NO contact according to an output signal from the concurrent logic controller; a first parallel circuit for controlling the second NO contact according to the output signal from the concurrent logic controller; a second parallel circuit for controlling the third NO contact according to the output signal from the concurrent logic controller; and a second series circuit for controlling the fourth NO contact according to the output signal from the concurrent logic controller.

The first series circuit and the first parallel circuit may receive the output signals from the first concurrent logic controller and the second concurrent logic controller included in a first train of the at least two trains as inputs. The second series circuit and the second parallel circuit may receive the output signals from the first concurrent logic controller and the second concurrent logic controller included in a second train of the at least two trains as inputs.

Each initiation circuit may further include a third circuit including a relay for controlling the second NO contact, the relay for controlling the second NO contact being controlled by the first parallel circuit; and a fourth circuit including a relay for controlling the third NO contact, the relay for controlling the third NO contact being controlled by the first parallel circuit. Here, the relays included in the third circuit and the fourth circuit are normally closed (NC) contacts.

The first series circuit or the second series circuit may include two relays connected in series, the two series relays being respectively turned on/off according to the output signal from the concurrent logic controller. The first NO contact or the fourth NO contact may be closed when the two relays are both on, and the first NO contact or the fourth NO contact may be open when at least one of the two relays is off.

The first parallel circuit or the second parallel circuit may include two relays connected in parallel, the two parallel relays being turned on/off according to the output signal from the concurrent logic controller. The relay included in the third circuit or the fourth circuit may be turned on when the relays included in the first parallel circuit or the second parallel circuit are all off, and the relays included in the third circuit or the fourth circuit may be turned off when at least one of the relays included in the first parallel circuit or the second parallel circuit is on.

The digital protection system according to the present invention is a protection system made up of a process protection system and a reactor protection system that performs safety functions of a nuclear power plant. The digital protection system according to the present invention can prevent a nuclear power plant from being shut down in the case of a single fault (i.e., a single point vulnerability, or SPV), by eliminating a component failure resulting in a reactor shutdown due to an SPV fault condition present in existing devices. The digital protection system according to the present invention allows the protection system to be safely operated even in the case of a CCF, by applying multiplexing to the digital protection system itself.

In addition, the digital protection system according to the present invention, considering diversity and independence of the protection system itself, includes comparative logic controllers and concurrent logic controllers of different (contrasting) types from each other to correspond to the CCF, thereby eliminating SPV shutdowns and effectively preparing for the case of a CCF shutdown.

In addition, according to the digital protection system of the present invention, it is possible to perform the reactor safety function in the case of the CCF, which results in improving safety and reliability.

In addition, according to the digital protection system of the present invention, it is possible to operate the power plant with zero SPVs and to improve maintenance conditions.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a block diagram of a protection system according to a related art;

FIG. 2 is a comparative view of the cabinet appearance of a reactor protection system of the related art and that of a reactor protection system of the present invention;

FIG. 3 is a block diagram of a digital protection system of the present invention;

FIG. 4 is a detailed block diagram of a portion of the digital protection system of FIG. 3;

FIG. 5 is a block diagram of a digital protection system according to an embodiment of the present invention; and FIGS. 6A to 6N are views of the digital protection system shown in FIG. 5, respectively illustrating system operation according various fault types.

DETAILED DESCRIPTION OF THE INVENTION

Hereinafter, a digital protection system according to the present invention will be described in detail with reference to the accompanying drawings. The present invention is not limited to the above-described embodiments, and various changes and modifications may be made without departing from the scope of the present invention. In addition, the matters described in the attached drawings may be different from those actually implemented by the schematic drawings to easily describe the embodiments of the present invention.

In the meantime, each component described below is only an example for implementing the present invention. Thus, in other implementations of the present invention, other components may be used without departing from the spirit and scope of the present invention.

Also, the expression of "comprising" is intended to merely denote that such elements are present to be "inclusive", and should not be understood as excluding any additional elements.

Also, the expressions such as 'first', 'second', etc. are expressions used only for distinguishing a plurality of components, and do not limit the order or other features among the components.

In the description of the embodiments, it is to be understood that forming each layer (film), area, pattern, or structure "on" or "under" a substrate, each layer (film), area, pad, or pattern includes: forming directly; or forming by interposing another layer therebetween. The criteria for "on" or "under" with respect to each layer are described with reference to the drawings.

When a part is "connected" to another part, it includes not only "directly connected" but also "indirectly connected" by interposing another part therebetween. Also, when certain portion is referred to as "comprising" certain components, it means that it can include other components, and does not exclude other components unless specifically stated otherwise.

FIG. 1 illustrates a SPV that may occur in the structure of a protection system according to a related art.

Referring to FIG. 1, a single fault occurs in one train (Train A) of the reactor protection system to cause one reactor trip breaker (RTB) to be open, which may lead to a reactor shutdown.

FIG. 2 compares the cabinet appearance of a reactor protection system according to the present invention with a reactor protection system of a related art.

Referring to FIG. 2, since the existing reactor protection system is an analog system and each logic gate is configured in the form of a hardware card, each card must be connected via various hardwirings to transmit signals in order to implement concurrent logic in the reactor protection systems, whereby there are disadvantages in that cabinet size is increased, cabling is complicated, and maintenance is difficult.

Meanwhile, in the case of the digital protection system according to the present invention, the concurrent logic of the protection system is implemented using software and operated on a CPU or a field programmable gate array (FPGA), whereby there are advantages in that the cabinet size is reduced, the cabling is simple, and the maintenance is easy.

In order to prevent the occurrence of a CCF, the digital protection system of the present invention duplexes the controllers into different types and implements the existing analog protection system as a digital protection system, thereby facilitating maintenance.

FIG. 3 illustrates a configuration of the digital protection system according to the present invention, and FIG. 4 more detailedly illustrates the configuration of FIG. 3, showing a process protection system and a reactor protection system included in the digital protection system.

Referring to FIGS. 3 and 4, the digital protection system according to the present invention may include four channels 221, 222, 223, and 224 of the process protection system, and two trains 231 and 232 of the reactor protection systems.

The four channels 221, 222, 223, and 224 of the process protection system may include the first comparison logic controllers 221-1 and 222-1 and the second comparison logic controllers 221-2 and 222-2 of different types and transmit the comparison logic results to the two trains 231 and 232 of the reactor protection system.

Although FIG. 3 illustrates an embodiment in which the process protection system includes four channels, it is not limited thereto. The process protection system of the present invention may include at least two channels.

More specifically, the comparative logic controllers 221-1, 222-1, 221-2, and 222-2 of the respective channels 221, 222, 223 and 224 in the process protection system generate comparison logic results based on various process variables collected from sensors 110, 120, 130, and 140 installed in the nuclear steam supply system 210. Also, the comparative logic controllers 221-1, 222-1, 221-2, and 222-2 may transmit the comparison logic results to the concurrent logic controller of each train 231 and 232 in the reactor protection system. The comparative logic controllers 221-1, 222-1, 221-2, and 222-2 of the respective channels receive signals from the sensors 110, 120, 130, and 140 that are multiplexed, thereby performing comparative logic algorithms independently of each other.

For example, the comparative logic controller included in at least one channel of the process protection system may determine whether hot-tube temperature information that has been sensed has reached a predetermined protection system setting and, and based on the determination, may transmit a signal indicating whether or not an abnormality exists to respective trains 231 and 232 of the reactor protection system. Here, each channel of the process protection system is physically/electrically isolated and independently derives its own result signal for each channel. For example, in the case of 2/4 concurrent logic, the concurrent logic controller generates a reactor shutdown signal when an abnormal signal is output from the comparison logic controller in at least two channels of process variables quadplexed.

Even if the process protection system is multiplexed with four channels in the present invention, the process variables may be triplexed or duplexed depending on type, in which signals may be assigned only to three channels of the process protection system and 2/3 concurrent logic is performed based on the comparison logic results received from these three channels in the reactor protection system to determine whether a reactor shutdown signal is generated or not in the case of triplexed process variables, and signals may be assigned to only two channels of the process protection system and 1/2 concurrent logic is performed in the reactor protection system to determine whether a reactor shutdown signal is generated or not in the case of a duplexed process variables.

The concurrent logic is not limited to 1/2, 2/3, and 3/4, but the concurrent logic may be 2/2, 1/3, 3/3, 3/4, and so on. When the concurrent logic described herein is defined as n/m, any concurrent logic is possible provided that n is greater than or equal to m.

Each channel of process protection system is configured with the first comparative logic controller and the second comparative logic controller of different types that are mutually independent. For example, the first comparative logic controller may be configured based on a FPGA, and the second comparative logic controller may be configured based on a programmable logic controller (PLC), in which two comparative logic controllers may be controlled independently of each other. Therefore, even if a CCF occurs in one controller, the other controller may perform the unique functions of the process protection system, thereby effectively coping with both of a SPV and a CCF.

Here, the comparative logic controllers may each transmit the comparison logic results to all concurrent logic controllers of the same type. The first comparative logic controllers 221-1, 222-1, 223-1, and 224-1 and the second comparative logic controllers 221-2, 222-2, 223-2, and 224-2 of the process protection system are configured with different types, and the first concurrent logic controllers 231-1 and 232-1 and the second concurrent logic controllers 231-2 and 232-2 in the reactor protection system are also configured with different types. Therefore, an entire protection system, from the process protection system (comparative logic controllers) to the reactor protection system (concurrent logic controllers), is independently controlled only by a device of the same type so that two protection systems may be practically operated. For example, an FPGA-based device allows its controllers to be operated independently of a PLC-based device without being influenced by each other, whereby the protection system may perform the safety function even when a CCF occurs.

Each of the trains 231 and 232 of the reactor protection system includes the first concurrent logic controllers 231-1 and 232-1 and the second concurrent logic controllers 231-2 and 232-2 of different types, performs concurrent logic according to the comparison logic result, and transmits the resulting control signal to a reactor trip switchgear system (to be described later), or RTSS, via an initiation circuit as described below.

Here, the reactor protection system may include a first train 231 and a second train 232. The first train 231 may include a first concurrent logic controller 231-1, a second concurrent logic controller 231-2, a first train serial initiation circuit 231-3, and a first train parallel initiation circuit 231-4; and the second train 232 may include a first concurrent logic controller 232-1, a second concurrent logic controller 232-2, a second train parallel initiation circuit 232-3, and a second train serial initiation circuit 232-4.

The concurrent logic controllers 231-1, 232-1, 231-2, and 232-2 of the reactor protection system receive the comparison logic results transmitted by the process protection system. Here, the comparison logic results are received from all multiplexed channels of the process protection system.

More specifically, the concurrent logic controllers 231-1, 232-1, 231-2, and 232-2 are provided to perform concurrent logic according to the number of channel trips (abnormal signals) included in the received comparison logic results and to transmit the resulting signal, indicating whether or not to shut down the reactor, to an RTSS 240 via the initiation circuits 231-3, 232-3, 231-4, and 232-4.

For example, when applying 2/4 logic for quadplexed process variables, it may be determined that the reactor status is abnormal when the comparison logic results include at least two abnormal signals. Therefore, when reactor status abnormality is detected in at least two channels among four channels of the process protection system, the digital protection system determines that the reactor status is abnormal and thus takes an action such as dropping a control rod.

The RTSS 240 is provided such that the reactor is normally operated when a nuclear steam supply system 210 is normal and the reactor is shut down when the status of the nuclear steam supply system 210 is abnormal, according to the control signals transmitted by the initiation circuits 231-3, 232-3, 231-4, and 232-4 of each train of the reactor protection system. Here, the RTSS 240 may perform the safety function even if a single fault or a CCF occurs in the comparative logic controllers or the concurrent logic controllers. This is because the controllers in the reactor protection system are constituted with concurrent logic controllers of different types. Therefore, even if a CCF occurs in either concurrent logic controller, a control signal path is secured by the other concurrent logic controller.

FIG. 5 is a representative view of the present invention, illustrating a detailed embodiment in which the digital protection system, the RTSS 240, a motor-generator (MG) set 241, and a control element drive mechanism (CEDM) 242 are associated. The MG set 241 may include a first MG set MG1 and a second MG set MG2. Here, controllers of the same type are shown in a box-bundled manner, to allow paths of the control signals to be clearly identified.

According to the present invention, the digital protection system includes a process protection system and a reactor protection system. The process protection system has, in one channel, a first comparative logic controller and a second comparative logic controller. The first and second comparative logic controllers of the present invention are of different (i.e., contrasting) types that are mutually independent from each other, whereby the first and second comparative logic controllers independently receive process variables as inputs and independently output comparison logic results.

Meanwhile, the reactor protection system has, in one train, a first concurrent logic controller and a second concurrent logic controller. The first and second concurrent controllers of the present invention are of different (i.e., contrasting) types that are mutually independent from each other, whereby the first and second concurrent controllers independently receive the comparison logic results (from the comparative logic controllers) as inputs and independently output concurrent logic results. The reactor protection system further includes at least two initiation circuits, each of which includes a series circuit in which a plurality of relays are connected in series and a parallel circuit in which a plurality of relays are connected in parallel. One of the series circuit relays is controlled (i.e., turned on/off) by receiving one of the concurrent logic results as an input, and one of the parallel circuit relays is controlled (i.e., turned on/off) by receiving the other of the concurrent logic results as an input. Here, the concurrent logic results are received (by the relays) from the concurrent logic controllers of different types.

The channels of the process protection system include the first comparative logic controllers 221-1, 222-1, 223-1, and 224-1 and the second comparative logic controllers 221-2 and 222-2, 223-2, and 224-2 of different types that are mutually independent, respectively, and the first comparative logic controllers 221-1, 222-1, 223-1, and 224-1 and the second comparative logic controllers 221-2, 222-2, 223-2, and 224-2 outputs comparison logic results by receiving the process variables as an input, in which the process protection system has at least two channels.

As shown in FIG. 5, the reactor protection system includes at least two channels. The channels may include the first comparative logic controllers 221-1, 222-1, 223-1, and 224-1 and the second comparative logic controllers 221-2, 222-2, 223-2, and 224-2 of different types that are mutually independent, respectively.

The first comparative logic controllers 221-1, 222-1, 223-1, and 224-1 may be configured based on an FPGA, and the second comparative logic controllers 221-2, 222-2, 223-2, and 224-2 may be configured based on a programmable logic controller (PLC), in which two comparative logic controllers may be controlled to be mutually independent.

The trains of the reactor protection system include the first concurrent logic controllers 231-1 and 232-1 and the second concurrent logic controllers 231-2 and 232-2 of different types that are mutually independent, respectively, and the first concurrent logic controllers 231-1 and 232-1 and the second concurrent logic controllers 231-2 and 232-2 outputs the concurrent logic results by receiving the comparison logic results as an input, in which the reactor protection system has at least two trains.

As shown in FIG. 5, the reactor protection system includes at least two trains. The trains include the first concurrent logic controllers 231-1 and 232-1 and second concurrent logic controllers 231-2 and 232-2 of different types that are mutually independent, respectively.

The first concurrent logic controllers 231-1 and 232-1 may be configured based on an FPGA, and the second concurrent logic controllers 231-2 and 232-2 may be configured based on a PLC, in which two comparative logic controllers may be controlled to be mutually independent.

The digital protection system further includes at least two initiation circuits. Here, the initiation circuits 231-3 and 231-4 included in the first train includes a series circuit 251 in which a plurality of relays 251-1 and 251-2 are connected in series and a parallel circuit in which a plurality of relays 252-1 and 252-2 are connected in parallel, and the initiation circuits 232-3 and 232-4 included in the second train include a series circuit 254 in which a plurality of relays 254-1 and 254-2 are connected in series and a parallel circuit 253 in which a plurality of relays 253-1 and 253-2 are connected in parallel.

The plurality of relays 251-1, 251-2, 254-1, and 254-2 included in the series circuits 251 and 254 are turned on/off by receiving the concurrent logic results from concurrent logic controllers of different types as an input, and the plurality of relays 252-1, 252-2, 253-1, and 253-2 included in the parallel circuits 252 and 253 are turned on/off by receiving the concurrent logic results from concurrent logic controllers of different type as an input.

More specifically, the relay 251-1 included in the series circuit 251 is turned on/off by receiving a concurrent logic result AF-1 as an input, and the relay 251-2 included in the series circuit 251 is turned on/off by receiving a concurrent logic result AP-1 different from the concurrent logic result AF-1 as an input.

The relay 254-1 included in the series circuit 254 is turned on/off by receiving a concurrent logic result BF-1 as an input, and the relay 254-2 included in the series circuit 254 is turned on/off by receiving a concurrent logic result BP-1 different from the concurrent logic result BF-1 as an input.

The relay 252-1 included in the parallel circuit 252 is turned on/off by receiving a concurrent logic result AF-2 as an input, and the relay 252-2 included in the parallel circuit 252 is turned on/off by receiving a concurrent logic result AP-2 different from the concurrent logic result AF-2 as an input.

The relay 253-1 included in the parallel circuit 253 is turned on/off by receiving a concurrent logic result BF-2 as an input and the relay 253-2 included in the parallel circuit 253 is turned on/off by receiving a concurrent logic result BP-2 different from the concurrent logic result BF-2 as an input.

The process protection system is configured to include a first channel, a second channel, a third channel, and a fourth channel. The number of channels is not limited thereto, and may be one or more.

The reactor protection system may include a first train (Train A) and a second train (Train B).

The process protection system may include the first FPGA-based comparative logic controllers 221-1, 222-1, 223-1, and 224-1 and the second PLC-based comparative logic controllers 221-2, 222-2, 223-2, and 224-2.

The comparative logic controllers each transmit the comparison logic results to all concurrent logic controllers of the same type.

The reactor protection system includes the first FPGA-based concurrent logic controllers 231-1 and 232-1 and the second PLC-based concurrent logic controllers 231-2 and 232-2 of the same type.

The first FPGA-based comparative logic controllers 221-1, 222-1, 223-1, and 224-1 transmit the comparison logic results to the first FPGA-based concurrent logic controllers 231-1 and 232-1 of the same type.

The second PLC-based comparative logic controllers 221-2, 222-2, 223-2, and 224-2 transmit the comparison logic results to the second PLC-based concurrent logic controllers 231-2 and 232-2 of the same type.

The process variables include at least one of reactor coolant hot tube and cold tube temperature information, pressurizer pressure information, pressurizer water level information, neutron flux information, reactor coolant flow rate information, containment building pressure information, steam generator water level information, steam pipe pressure information, and refueling water tank level information.

The sensor described above transmits at least one of information included in the process variables to at least one channel of the process protection system. Each channel receives at least one of information included in the process variable, in which the number and type of process variables received by the first channel, the second channel, the third channel, and the fourth channel may be the same or different.

The first concurrent logic controllers 231-1 and 232-1 receives the comparison logic results including normal signal or abnormal signal from the first comparative logic controllers 221-1, 222-1, 223-1, and 224-1 included in each channel of the process protection system, and the concurrent logic results are output based on the number of the comparison logic results and the number of abnormal signals, in which the concurrent logic results includes two different output signals, one output signal being input to one relay AF-1 or BF-1 included in the series circuit and the other output signal being input to one relay AF-2 or BF-2 included in the parallel circuit.

The first comparative logic controllers 221-1, 222-1, 223-1, and 224-1 each compare the received process variable with settings to determine whether to output a normal signal or an abnormal signal. The first comparative logic controllers 221-1, 222-1, 223-1, and 224-1 each output as many comparison logic results as the number of process variables received. That is, if the first comparative logic controller 221-1 receives three process variables, it compares the three process variables with the respective settings to output three comparison logic results.

The first concurrent logic controllers 231-1 and 232-1 output the concurrent logic results based on the number of comparison logic results of abnormal signals compared with the total number of comparison logic results received. In this case, the first concurrent logic controllers 231-1 and 232-1 perform n/m concurrent logic defined by the total number (m) of comparison logic results and the number (n) of comparison logic results of abnormal signals for each process variable, and output the concurrent logic results that is a reactor shutdown signal when the n/m concurrent logic defined above is satisfied for at least one process variable.

Referring to FIG. 5, when the first concurrent logic controllers 231-1 and 232-1 output the concurrent logic results of the reactor shutdown signals, AF-1 is "0," AF-2 is "1," BF-1 is "0," and BF-2 is "1."

The second concurrent logic controller receives the comparison logic results including normal signal or abnormal signal from the second comparative logic controller included in each channel of the process protection system and outputs the concurrent logic results based on the number of the comparison logic results and the number of abnormal signals, in which the concurrent logic results include two different output signals, one output signal being input to the other relay AP-1 or BP-1 included in the series circuit and the other output signal being input to the other relay AP-2 or BP-2.

The second comparative logic controllers 221-2, 222-2, 223-2, and 224-2 compare the received process variables with settings to determine whether to output a normal signal or an abnormal signal. The second comparative logic controllers 221-2, 222-2, 223-2, and 224-2 each output as many comparison logic results as the number of received process variables. That is, when the second comparative logic controllers 221-2, 222-2, 223-2, and 224-2 receive three process variables, it compares the three process variables with each setting to output three comparison logic results.

The second concurrent logic controllers 231-2 and 232-2 output the concurrent logic results based on the number of comparison logic results of abnormal signals compared with the total number of comparison logic results received. In this case, the second concurrent logic controllers 231-2 and 232-2 perform n/m concurrent logic defined by the total number (m) of comparison logic results and the number (n) of comparison logic results of abnormal signals for each process variable, and output the concurrent logic result that is a reactor shutdown signal when the n/m concurrent logic defined above is satisfied for at least one process variable.

Referring to FIG. 5, when the second concurrent logic controllers 231-2 and 232-2 output the concurrent logic results of the reactor shutdown signals, AP-1 is "0," AP-2 is "1," BP-1 is "0," and BP-2 is "1."

The first concurrent logic controllers 231-1 and 232-1 output the concurrent logic results when the comparison logic results include at least one abnormal signal, in which the output signals AF-1 and BF-1 of "0" among the concurrent logic results are input to one relay 251-1 and 254-1 included in each of the series circuits and the output signals AF-2 and BF-2 of "1" are input to one relay 252-1 and 253-1 included in each of the parallel circuits. The concurrent logic result means a reactor shutdown signal.

The second concurrent logic controllers 231-2 and 232-2 output the concurrent logic results when the comparison logic result includes at least one abnormal signal, in which the output signals AP-1 and BP-1 of "0" among the concurrent logic results are input to one relay 251-2 and 254-2 included in each of the series circuits and the output signals AP-2 and BP-2 of "1" are input to one relay 252-2 and 253-2 included in each of the parallel circuits. The concurrent logic result means a reactor shutdown signal.

The first concurrent logic controllers 231-1 and 232-1 output the concurrent logic results when the comparison logic result includes at least one normal signal, in which the output signals AF-1 and BF-1 of "1" among the concurrent logic results are input to one relay 251-1 and 254-1 included in each of the series circuits and the output signals AF-2 and BF-2 of "0" are input to one relay 252-1 and 253-1 included in each of the parallel circuits. The concurrent logic result means a reactor shutdown signal.

The second concurrent logic controllers 231-2 and 232-2 output the concurrent logic results when the comparison logic result includes at least one normal signal, in which the output signals AF-1 and BF-1 of "1" among the concurrent logic results are input to the other relay 251-2, 254-2 included in each of the series circuits and the output signals AP-2 and BP-2 of "0" are input to the other relay 252-2 and 253-2 included in each of the parallel circuits. The concurrent logic result means a reactor shutdown signal.

Here, in the case where the comparison logic result includes at least one abnormal signal, the output signals AF-1 and BF-1, which have of a logic value of "0" according to the embodiment, have a first logic value according to the present invention; conversely, the output signals AF-2 and BF-2, which have of a logic value of "1" according to the embodiment, have a second logic value according to the present invention. On the other hand, in the case where the comparison logic result includes at least one normal signal, the output signals AF-1 and BF-1, which have of a logic value of "1" according to the embodiment, have a first logic value according to the present invention; conversely, the output signals AF-2 and BF-2, which have of a logic value of "0" according to the embodiment, have a second logic value according to the present invention. In other words, the first and second logic values are opposite logic values. Also, concurrent logic results being input to a relay included in each of the series circuits, or to a relay included in each of the parallel circuits, means that the concurrent logic results are effectively input to the series circuits or the parallel circuits accordingly.

The digital protection system further includes a RTSS 240, and the RTSS 240 is configured with four RTBs. The RTBs may include a first normally-open (NO) contact 243, a second NO contact 244, a third NO contact 245, and a fourth NO contact 246.

The MG set 241 supplies driving power for operating a control element drive mechanism (CEDM) 242.

In the case of the RTSS 240 of the present invention, the NO contacts 243, 244, 245, and 246 are located between the MG set 241 and the CEDM 242 and thus the power may be supplied to the CEDM 242 or may not be supplied to the CEDM 242 according to switching-on or switching-off of the NO contacts 243, 244, 245, and 246.

More specifically, when at least one of the first NO contact or the second NO contact is closed and at least one of the third NO contact or the fourth NO contact is closed, the power is supplied to the CEDM 242. This is because the first NO contact and the second NO contact are connected in parallel to each other and the third NO contact and the fourth NO contact are connected in parallel to each other so that a ladder-shaped circuit may selectively supply the power to the CEDM 242

When both the first NO contact 243 and the second NO contact 244 are open, or both the third NO contact 245 and the fourth NO contact 246 are closed, the MG set 241 is provided to interrupt the power to the CEDM 242.

The CEDM 242 may control the position of a control rod to control a nuclear reaction in a reactor. In addition, the CEDM 242 directly grabs the control rod with the power supplied from the MG set 241, to allow the control rod to be released and thus dropped via gravity when the power is interrupted by the RTSS 240.

More specifically, the CEDM 242 is provided such that the control rod is dropped to cause the reactor to be shut down when the power supply is not applied, and the position of the control rod is maintained to allow the reactor to be normally operated when the power supply is applied. When the control rod is dropped, the reactor is immediately shut down, whereby it is possible to take a quick action when an abnormal reactor condition is detected.

Since the RTSS 240 of the present invention has four RTBs, the RTBs being respectively configured with NO contacts 243, 244, 245, and 246, the protection system may be stably operated in conjunction with series circuits and parallel circuits even when a common failure component occurs.

In the case of NO contact, a fixed contact and a movable contact are initially detached from each other, and the fixed contact and the movable contact come into contact with each other to allow current to flow when an external force is applied. In other words, when the force (for example, electromagnetic force) is generated from the outside, the NO contact is connected and thus changed from normally open state to a closed state. In the case of FIG. 5, the NO contacts 243, 244, 245, and 246 may be changed from the open state to the closed state due to an electromagnetic force generated in the coil when a current flows through the series circuit.

In the case of a normal closed (NC) contact described above, the fixed contact and the movable contact are initially kept connected to each other, and are disconnected from each other to cause the current not to flow when the external force is applied. In other words, when the force (for example, electromagnetic force) is generated from the outside, the NC contact is disconnected and thus changed from a normally closed state to an open state. In the case of FIG. 5, the NC contact 255-1 of the relay included in the third circuit may be changed from the closed state to the open state due to the electromagnetic force generated in the coil when a current flows through the first parallel circuit.

The first NO contact 243 is connected between the MG set 241 and a central node 247.

The second NO contact 244 is connected between the MG set 241 and the central node 247.

The third NO contact 245 is connected between the central node 247 and the CEDM 242.

The fourth NO contact 246 is connected between the central node 247 and the CEDM 242.

The digital protection system according to an embodiment of the present invention is provided such that the RTSS 240 receiving the operation result of each train of the reactor protection system is configured in a "ladder" shape, in order to protect the unique safety functions of the protection system and to apply a design of minimizing unnecessary reactor shutdown.

Further, the RTSS 240 of the present invention may include a first series circuit 251, a first parallel circuit 252, a second parallel circuit 253, and a second series circuit 254. The series circuits 251 and 254 or the parallel circuits 252 and 253 may control such that the power may be to be supplied to the CEDM 242 by allowing the NO contacts 243, 244, 245, and 246 to be closed/open.

The first parallel circuit and the second parallel circuit may indirectly control the NO contacts 244 and 245, respectively. As will be described later, the first parallel circuit controls the contact 255-1 of the relay included in the third circuit, in which the third circuit directly controls to open/close the second NO contact. The second parallel circuit controls the contact 256-1 of the relay included in the fourth circuit, in which the fourth circuit directly controls to open/close the third NO contact.

To this end, the output signal from the concurrent logic controller includes the series circuit control signals AF-1, AP-1, BF-1, and BP-1 and the parallel circuit control signals AF-2, AP-2, BF-2, and BP-2, and the first concurrent logic controllers 231-1 and 232-1 or the second concurrent logic controllers 232-1 and 232-2 generates the series circuit control signals AF-1, AP-1, BF 1, and BP-1 and the parallel circuit control signals AF-2, AP-2, BF-2, and BP-2.

For example, the output signal from the concurrent logic controller controls such that the series circuits 251 and 254 are turned on/off, and the NO contacts 243 and 246 connected to the series circuits 251 and 254 are repeatedly connected and disconnected according to on/off of the series circuits 251 and 254.

The initiation circuit includes a first series circuit for controlling closing/opening of the first NO contact according to an output signal from the concurrent logic controller; a first parallel circuit controlling close/open of the second NO contact according to an output signal from the concurrent logic controller; a second parallel circuit for controlling closing/opening of the third NO contact according to an output signal from the concurrent logic controller; and a second series circuit for controlling closing/opening of the fourth NO contact according to an output signal from the concurrent logic controller.

The first series circuit 251 may control closing/opening of the first NO contact 243 according to an output signal from the concurrent logic controller.

The first parallel circuit 252 may control closing/opening of the second NO contact 244 according to the output signal from the concurrent logic controller. In detail, the first parallel circuit 252 may control closing/opening of the second NO contact 244 via the third circuit 255 according to the output signal from the concurrent logic controller.

The second parallel circuit 253 may control closing/opening of the third NO contact 245 according to the output signal from the concurrent logic controller. In detail, the second parallel circuit 252 may control closing/opening of the third NO contact 245 via the fourth circuit 256 according to the output signal from the concurrent logic controller.

The second series circuit 254 may control closing/opening of the fourth NO contact 246 according to the output signal from the concurrent logic controller.

The first series circuit 251 and the first parallel circuit 252 receive the output signals AF-1, AF-2, AP-1, and AP-2 from the first concurrent logic controller 231-1 and the second concurrent logic controller 231-2 included in any one train.

The second series circuit 253 and the first parallel circuit 254 receive the output signals BF-1, BF-2, BP-1, and BP-2 from the first concurrent logic controller 232-1 and the second concurrent logic controller 232-2 included in the other train.

The initiation circuit includes a third circuit 255 including a relay 255-1 and controlling closing/opening of the second NO contact 244 according to on/off of the relay 255-1; and a fourth circuit 256 including a relay 256-1 and controlling closing/opening of the third NO contact 245 according to on/off of the relay 256-1, in which the first parallel circuit 252 controls on/off of the relay 255-1 included in the third circuit 255, and the second parallel circuit 253 controls on/off of the relay 256-1 included in the fourth circuit 256.

The relays 255-1 and 256-1 that are included in the third circuit 255 and the fourth circuit 256 are NC contacts.

Here, the first series circuit 251, the first parallel circuit 252, the second parallel circuit 253, and the second series circuit 254 all receive control signals from the concurrent logic controllers of different types. Since the series circuits or the parallel circuits constituting the initiation circuit of the present invention all receive the control signals from the concurrent logic controllers of different types, it is possible to secure reactor safety even though any one concurrent logic controller stops operating.

More specifically, the first series circuit 251 or the second series circuit 254 includes two relays connected in series, and the relay is turned on/off according to the output signal from the concurrent logic controller, in which the first NO contact 243 or the fourth NO contact 246 is turned on when all the relays are on, and the first NO contact 243 or the fourth NO contact 246 is turned off when at least one of the relays is off.

Considering the first series circuit 251 on features described above, the first series circuit 251 includes two relays 251-1 and 251-2 connected in series, in which the relays 251-1 and 251-2 are turned on/off by the output signal from the concurrent logic controller, the first NO contact 243 is turned on when all the relays 251-1 and 251-2 are on, and the first NO contact 243 is turned off when at least one of relays 251-1 and 251-2 is off.

Considering the second series circuit 254 on the feature described above, the second series circuit 254 includes two relays 254-1 and 254-2 connected in series, in which the relays 254-1 and 254-2 are turned on/off by the output signal from the concurrent logic controller, the fourth NO contact 246 is turned on when all the relays 254-1 and 254-2 are on, and the fourth NO contact 246 is turned off when at least one of relays 254-1 and 254-2 are off.

The relays in the series circuit are provided to receive the output signals from the different concurrent logic controllers. For example, when receiving a switch-on signal from the FPGA-based concurrent logic controller and the PLC-based concurrent logic controller, the first series circuit 251 turns on both relays, thereby causing the first contact 243 to be closed.

On the contrary, due to characteristics of the series circuit, when the output signal from at least one of the FPGA-based concurrent logic controller or the PLC-based concurrent logic controller is switched off, the series circuit is turned off to cause the first NO contact 243 to be open.

More specifically, the first parallel circuit 252 or the second parallel circuit 253 includes two relays connected in parallel, in which the relays are turned on/off by the output signals from the concurrent logic controllers, the relay included in the third circuit 255 or the fourth circuit 256 is turned on when all the relays are turned off, and the relay included in the third circuit 255 or the fourth circuit 256 is turned off when at least one of the relays is on.

Considering the first parallel circuit 252 on the features described above, the first parallel circuit 252 includes two relays 252-1 and 252-2 connected in parallel, in which the relays 252-1 and 252-2 are turned on/off by the output signals from the concurrent logic controllers, the relay 255-1 included in the third NO circuit 255 is turned on when all the relays 252-1 and 252-2 are off, and the relay 255-1 included in the third circuit 255 is turned off when at least one of relays 252-1 and 252-2 is on.

Considering the second parallel circuit 253 on the feature described above, the second parallel circuit 253 includes two relays 253-1 and 253-2 connected in series, in which the relays 253-1 and 253-2 are turned on/off by the output signals from the concurrent logic controllers, the relay 256-1 included in the fourth circuit 256 is turned on when all the relays 253-1 and 253-2 are off, and the relay 256-1 included in the fourth circuit 256 is turned off when at least one of relays 253-1 and 253-2 is on.

As a result, when the relays included in the first parallel circuit 252 are all off, the relay included in the third circuit 255 is turned on to allow the second NO contact 244 to be closed.

In addition, when the relays included in the second parallel circuit 253 are all off, the relay in the fourth circuit 256 is turned on to allow the third NO contact 245 to be closed.

When at least one of the relays included in the first parallel circuit 252 is on, the relay included in the third circuit 255 is turned off to allow the second NO contact 244 to be open.

In addition, when at least one of the relays included in the second parallel circuit 253 is on, the relay included in the fourth circuit 256 is turned off to allow the third NO contact 245 to be open. Here, the relays included in the third circuit 255 and the fourth circuit 256 are the NC contacts 255-1 and 256-1, respectively.

The relays included in the parallel circuit are provided to receive control signals from the different concurrent logic controllers. For example, when the control signal (switched off) is received from the FPGA-based concurrent logic controller and the control signal (switched off) is received from the PLC-based concurrent logic controller, the first parallel circuit 252 turns off both relays, thereby allowing the second NO contact 244 to be open.

On the contrary, due to characteristic of the parallel circuit, when at least one of the FPGA-based concurrent logic controller or PLC-based concurrent logic controller is switched on, the parallel circuit is closed to allow the second NO contact 244 to be open.

Therefore, the digital protection system of the present invention is configured such that the power is supplied in the order of the MG set 241, the RTSS 240, and the CEDM 242, and the CEDM 242 drops the control rod to cause the reactor to be shut down when the power is not supplied to the CEDM 242 according to close/open state of the contacts in the RTSS 240.

FIGS. 6A to 6N are views illustrating various embodiments in which the digital protection system of the present invention is provided to control a normal reactor operation or a reactor shutdown according to various failure types. Each configuration in FIGS. 6A to 6N is the same as that in FIG. 5.

FIG. 6A illustrates operations of the initiation circuit of the present invention in the case of the power plant under a normal condition and a safety system under a normal condition. When the nuclear power plant is normal and the safety system is normal, the first NO contact 243 to the fourth NO contact 246 included in the initiation circuit of the present invention are all kept closed and the power is supplied to the CEDM 242. Therefore, the CEDM 242 does not drop the control rod to allow the reactor to be normally operated.

FIG. 6B illustrates operations of the inventive initiation circuit in the case of the power plant under an abnormal condition and the safety system under a normal condition. When the nuclear power plant is abnormal and the safety system is normal, the first NO contact 243 to the fourth NO contact 246 included in the initiation circuit of the present invention are all kept open, and the power is not supplied to the CEDM 242. Therefore, the CEDM 242 drops the control rod to cause the reactor to be shut down.

FIG. 6C illustrates operations of the initiation circuit of the present invention in the case of the power plant under a normal condition and the safety system under an abnormal condition. Although the nuclear power plant is normal, the PLC-based concurrent logic controller of the safety system may have the AP-2 signal and the BP-2 signal detected as an abnormal signal (switched on), rather than an original signal (switched off).

Here, any one of two relays in the first parallel circuit and the second parallel circuit is turned on, so that the relays in the third series circuit and the fourth series circuit are turned off and the second NO contact and the third NO contact are kept open. However, since the first NO contact 243 and the fourth NO contact 246 controlled by the first series circuit and the second series circuit are still kept closed, the power is normally supplied to the CEDM 242 via the first NO contact 243 and the fourth NO contact 246, thereby allowing the reactor to be normally operated.

FIG. 6D illustrates operations of the initiation circuit of the present invention in the case of the power plant under an abnormal condition and the safety system under a normal condition. It corresponds to the worst case where the nuclear power plant is abnormal and the safety system is also abnormal. In this case, since the nuclear power plant abnormally operates, the safety system must immediately drop the control rod to cause the reactor to be shut down. However, the safety system may not be able to drop the control rod properly due to a problem occurring in the safety system.

However, the protective system of the present invention can solve this problem. For example, the PLC-based concurrent logic controller of the safety system may have the AP-1 signal and the BP-1 signal detected as an abnormal signal (switched on), rather than an original signal (switched off). At this time, since any one of two relays in the first series circuit 251 and the fourth circuit 256 is off, the first NO contact and the fourth NO contact 246 are kept open. Since two relays included in the first parallel circuit 252 and the second parallel circuit 253 are all on, the relay included in the third circuit 255 and the fourth circuit 256 are turned off. Therefore, since the first NO contact 243, the second NO contact 244, the third NO contact 245, and the fourth NO contact 246 are all kept open, the power is not supplied to the CEDM 242 to cause the control rod to be dropped and thus the reactor to be shut down.

FIG. 6E illustrates operations of the initiation circuit of the present invention in the case of the power plant under a normal condition and the safety system under an abnormal condition. The AP-1 signal and the BP-1 signal in the PLC-based concurrent logic controller of the safety system may be detected as an abnormal signal (switched off), rather than an original signal (switched on).

Here, since any one of the relays in the first series circuit 251 and the fourth circuit 256 is off, the first NO contact 243 and the fourth NO contact 246 are kept open. However, the relays in the third circuit 255 and the fourth circuit 256 controlled by the first parallel circuit 252 and the second parallel circuit 253 are kept on, whereby the second NO contact 244 and the third NO contact 245 are kept on. As a result, the power may be normally supplied to the CEDM 242 via the second NO contact 244 and the third contact 245.

FIG. 6F illustrates operations of the initiation circuit of the present invention in the case of the power plant under an abnormal condition and the safety system under an abnormal condition. It corresponds to the worst case where the nuclear power plant is abnormal and the safety system is also abnormal. In this case, since the nuclear power plant is abnormal, the safety system should immediately drop the control rod, but the control rod may not be properly dropped due to a problem occurring in the safety system.

However, the protective system of the present invention can solve this problem. For example, the PLC-based concurrent logic controller of the safety system may have the AP-2 signal and the BP-2 signal detected as an abnormal signal (switched off), rather than an original signal (switched on). Then, any one of two relays included in each of the first parallel circuit 252 and the second parallel circuit 253 is turned on, whereby the relays included in the third circuit 255 and the fourth circuit 256 are turned off. Therefore, since the first NO contact 243, the second NO contact 244, the third NO contact 245, and the fourth NO contact 246 are all kept open, the power is not supplied to the CEDM 242 to cause the control rod to be dropped and thus the reactor to be shut down.

FIG. 6G illustrates operations of the initiation circuit of the present invention when a first in-cabinet power supply PW1 included in the first series circuit 251 is abnormal in the case of the power plant under a normal condition and the safety system under a normal condition.

The relays included in the first series circuit 251 are all on, but no current is supplied from the first in-cabinet power supply PW1, whereby the first NO contact 243 is open.

The relays included in the first parallel circuit 252 are all turned off, and thus relay included in the third circuit 255 is turned on. Therefore, the second NO contact 244 is closed.

The relays included in the second parallel circuit 253 are all turned off, and thus the relay included in the fourth circuit 256 is turned on. Therefore, the third NO contact 245 is closed.

The relays included in the second series circuit 254 are all turned on, and thus the fourth NO contact 246 is closed.

The power may be normally supplied to the CEDM 242 via the second NO contact 244 and the third NO contact 245 or the fourth NO contact 246, thereby allowing the rector to be normally operated.

FIG. 6H illustrates operations of the initiation circuit of the present invention when the first in-cabinet power supply PW1 included in the first series circuit 251 is abnormal in the case of the power plant under an abnormal condition and the safety system under a normal condition.

The relays included in the first series circuit 251 are all off and no current is supplied from the first in-cabinet power supply PW1, whereby the first NO contact 243 is open.

The relays included in the first parallel circuit 252 are all turned on and the relay included in the third circuit 255 is turned off. Therefore, the second NO contact 244 is open.

The relays included in the second parallel circuit 253 are all turned on and the relay included in the fourth circuit 256 is turned off. Therefore, the third NO contact 245 is open.

The relays included in the second series circuit 254 are all turned off, whereby the fourth NO contact 246 is open.

The power is not supplied to the CEDM 242 and the control rod is dropped, thereby causing the reactor to be shut down.

FIG. 6I illustrates operations of the initiation circuit of the present invention when the in-cabinet power supplies PW2 included in the first parallel circuit 252 and the third circuit 255 are all abnormal in the case of a the power plant under a normal condition and the safety system under a normal condition.

The relays included in the first series circuit 251 are all turned on and thus the first NO contact 243 is closed.

The relays included in the first parallel circuit 252 are all turned off, and thus the relay included in the third circuit 255 is turned on. However, since no current is supplied from a second in-cabinet power supply PW2, the second NO contact 244 is open.

The relays included in the second parallel circuit 253 are all turned off and thus the relays included in the fourth circuit 256 are turned on. Therefore, the third NO contact 245 is closed.

The relays included in the second series circuit 254 are all turned on and thus the fourth NO contact 246 is closed.

The power may be normally supplied from the MG set 241 to the CEDM 242 via the first NO contact 243 and the third NO contact 245 or the fourth NO contact 246, thereby allowing the reactor to be normally operated.

FIG. 6J illustrates operations of the initiation circuit of the present invention when the second in-cabinet power supply PW2 included in the first parallel circuit 252 and the third circuit 255 are abnormal in the case of the power plant under an abnormal condition and the safety system under a normal condition.

The relays included in the first series circuit 251 are all off, and thus the first NO contact 243 is open.

The relays included in the first parallel circuit 252 are all turned on, but no current is supplied from the second in-cabinet power supply PW2, whereby the relay included in the third circuit 255 is turned on. However, there is also no current supplied from the second in-cabinet power supply PW2 included in the third circuit 255, and thus the second NO contact 244 is open.

The relays included in the second parallel circuit 253 are all turned on and thus the relay included in the fourth circuit 256 is turned off, whereby the third NO contact 245 is open.

The relays included in the second series circuit 254 are all turned off and thus the fourth NO contact 246 is open.

The power is not supplied to the CEDM 242, thereby causing the control rod to be dropped and the reactor to be shut down.

FIG. 6K illustrates operations of the initiation circuit of the present invention when the first in-cabinet power supply PW1 included in the first series circuit 251 and the second in-cabinet power supplies PW2 included in the first parallel circuit 252 and the third circuit 255 are all abnormal in the case of the power plant under a normal condition and the safety system under a normal condition.

The relays included in the first series circuit 251 are all on, but no current is supplied from the first in-cabinet power supply PW1, whereby the first NO contact 243 is open.

The relays included in the first parallel circuit 252 are all turned off, and the relay included in the third circuit 255 is turned on. However, no current is supplied from the second in-cabinet power supply PW2 and thus the second NO contact 244 is open.

The relays included in the second parallel circuit 253 are all turned off and thus the relay included in the fourth circuit 256 is turned on, whereby the third NO contact 245 is closed.

The relays included in the second series circuit 254 are all turned on and thus the fourth NO contact 246 is closed.

The power is not supplied to the CEDM 242, thereby causing the control rod to be dropped and the reactor to be shut down.

FIG. 6I illustrates operations of the initiation circuit of the present invention when the first in-cabinet power supply PW1 included in the first series circuit 251 and the second in-cabinet power supplies PW2 included in the first parallel circuit 252 and the third circuit 255 are all abnormal in the case of the power plant under an abnormal condition and the safety system under a normal condition.

The relays included in the first series circuit 251 are all off and the power is not supplied from the first in-cabinet power supply PW1, whereby the first NO contact 243 is open.

The relays included in the first parallel circuit 252 are all turned on, but no current is supplied from the in-cabinet power supply PW2, whereby the relay included in the third circuit 255 is turned on. However, there is also no current supplied from the second in-cabinet power supply PW2 included in the third circuit 255, and thus the second NO contact 244 is open.

The relays included in the second parallel circuit 253 are all turned on and the relay included in the fourth circuit 256 is turned off, whereby the third NO contact 245 is open.

The relays included in the second series circuit 254 are all turned off, and thus the fourth NO contact 246 is open.

The power is not supplied to the CEDM 242, thereby causing the control rod to be dropped and the reactor to be shut down.

FIG. 6M illustrates operations of the initiation circuit of the present invention when the first in-cabinet power supply PW1 included in the first series circuit 251, the second in-cabinet power supplies PW2 included in the first parallel circuit 252 and the third circuit 255, the in-cabinet power supply PW3 included in the second series circuit 254, and the fourth in-cabinet power supplies PW4 included in the second parallel circuit 253 and the fourth circuit 256 are all abnormal in the case of the power plant under a normal condition and the safety system under a normal condition.

The relays included in the first series circuit 251 are all on, but no current is supplied from the first in-cabinet power supply PW1, whereby the first NO contact 243 is open.

The relays included in the first parallel circuit 252 are all turned off and thus the relay included in the third circuit 255 is turned on. However, no current is supplied from the second in-cabinet power supply PW2, and thus the second NO contact 244 is open.

The relays included in the second parallel circuit 253 are all turned off, and the relay included in the fourth circuit 256 is turned on. However, since no current is supplied from a third in-cabinet power supply PW3, the third NO contact 245 is open.

The relays included in the second series circuit 254 are all turned on, but no current is supplied from the fourth in-cabinet power supply PW4, whereby the fourth NO contact 246 is open.

The power is not supplied to the CEDM 242, thereby causing the control rod to be dropped and the reactor to be shut down.

FIG. 6N illustrates operations of the initiation circuit of the present invention when the first in-cabinet power supply PW1 included in the first series circuit 251, the second in-cabinet power supplies PW2 included in the first parallel circuit 252 and the third circuit 255, the third in-cabinet power supply PW3 included in the second series circuit 254, and the fourth in-cabinet power supplies PW4 included in the second parallel circuit 253 and the fourth circuit 256 are all abnormal in the case of the power plant under a normal condition and the safety system under a normal condition.

The relays in the series circuit 251 are all off and no current is supplied from the first in-cabinet power supply PW1, whereby the first NO contact 243 is open.

The relays are all turned on and no current is supplied from the second in-cabinet power supply PW2 in the first parallel circuit 252, whereby the relay included in the third circuit 255 is turned on. However, there is also no current supplied from the second in-cabinet power supply PW2 included in the third circuit 255, thereby causing the second NO contact 244 to be open.

The relays in the second parallel circuit 253 are all turned on and no current is supplied from the third in-cabinet power supply PW3, whereby the relay included in the fourth circuit 256 is turned on. The third NO contact 245 is therefore open.

The relays in the second series circuit 254 are all off and no current is supplied from a fourth in-cabinet power supply PW4, whereby the first NO contact 243 is open.

The power is not supplied to the CEDM 242, thereby causing the control rod to be dropped and the reactor to be shut down.

Referring to FIG. 6A to FIG. 6N, in an emergency where a control rod drop signal must be generated, even though a failure occurs in any one relay or contact of the safety system, the digital protection system of the present invention may control the CEDM by allowing the remaining relays and contacts to be compensated with each other, whereby the safety system of the nuclear power plant may be normally operated even in a situation of a SPV or a CCF, and therefore a normal reactor operation or reactor shutdown may be processed.

The embodiments of the present invention described above are disclosed for the purpose of illustration, and the present invention is not limited thereto. Further, it will be apparent to those skilled in the art that various modifications and variations can be made in the present invention without departing from the spirit and scope of the invention and such modifications and alterations are considered to be within the scope of the present invention.

What is claimed is:

1. A digital protection system having at least two channels and at least two trains, the system comprising:
   a reactor trip switchgear system (RTSS) including at least one reactor trip breaker (RTB) for each train to control a supply of power to a control element drive mechanism (CEDM), each RTB disposed between the supply of power and the CDEM;
   a process protection system having, in one channel, first and second comparative logic controllers of different types that are mutually independent of each other, the first and second comparative logic controllers each receiving process variables as inputs and each outputting comparison logic results;
   a reactor protection system having, in one train, first and second concurrent logic controllers of different types that are mutually independent from each other, the first and second concurrent controllers each receiving the comparison logic results as inputs and each outputting concurrent logic results, the reactor protection system comprising a first initiation circuit including a first pair of coils and a second initiation circuit including a second pair of coils, each of the first and second initiation circuits further including a series circuit in which a plurality of relays are connected in series and a parallel circuit in which a plurality of relays are connected in parallel,
   wherein one of the series circuit relays is controlled by receiving one of the concurrent logic results as an input and one of the parallel circuit relays is controlled by receiving the other of the concurrent logic results as an input, and
   wherein, according to the concurrent logic results, the first initiation circuit transmits a control signal to the RTSS via the first pair of coils and the second initiation circuit transmits a control signal to the RTSS via the second pair of coils.

2. The digital protection system of claim 1, wherein the at least two channels include a first channel, a second channel, a third channel, and a fourth channel.

3. The digital protection system of claim 1, wherein the at least two trains include a first train and a second train.

4. The digital protection system of claim 1, wherein the different types of comparative logic controllers include a field programmable gate array (FPGA) type and a programmable logic controller (PLC) type.

5. The digital protection system of claim 1, wherein the comparative logic controllers each transmit the comparison logic results only to concurrent logic controllers of one type.

6. The digital protection system of claim 1, wherein the process variables include information indicative of at least one of a reactor coolant hot-tube temperature, a reactor coolant cold-tube temperature, a reactor coolant flow rate, a pressurizer pressure, a pressurizer water level, a neutron flux value, a containment building pressure, a steam generator water level, a steam pipe pressure, and a refueling water tank level.

7. The digital protection system of claim 1,
   wherein the comparison logic results include one of a normal signal and an abnormal signal,
   wherein the first concurrent logic controller outputs the concurrent logic results based on the number of the comparison logic results and the number of the abnormal signals received from the first comparative logic controllers included in each channel, the outputted concurrent logic results of the first concurrent logic controller including a first output signal being input to one relay included in the series circuit and a second output signal being input to one relay included in the parallel circuit, the first and second output signals having opposite logic values, and
   wherein the second concurrent logic controller outputs the concurrent logic results based on the number of the comparison logic results and the number of the abnormal signals received from the second comparative logic controllers included in each channel, the outputted concurrent logic results of the second comparative logic controllers including a third output signal being input to one relay included in the series circuit and a fourth output signal being input to one relay included in the parallel circuit, the third and fourth output signals having opposite logic values.

8. The digital protection system of claim 7,
wherein the first concurrent logic controller outputs the concurrent logic results when the received comparison logic results includes at least one abnormal signal, by outputting a first logic value to the series circuit and a second logic value to the parallel circuit, and
wherein the second concurrent logic controller outputs the concurrent logic results when the received comparison logic results include at least one abnormal signal, by outputting the first logic value to the series circuit and the second logic value to the parallel circuit.

9. The digital protection system of claim 7,
wherein the first concurrent logic controller outputs the concurrent logic results when the received comparison logic results includes at least one normal signal, by outputting a first logic value to the series circuit and a second logic value to the parallel circuit, and
wherein the second concurrent logic controller outputs the concurrent logic results when the received comparison logic results include at least one normal signal, by outputting the first logic value to the series circuit and the second logic value to the parallel circuit.

10. The digital protection system of claim 1,
wherein the supply of power is generated by a motor-generator (MG) set,
wherein each RTB of the RTSS includes a normally open (NO) contact, and
wherein the NO contacts of the RTBs include
first and second NO contacts respectively connected between the MG set and a central node, and
third and fourth NO contacts respectively connected between the central node and the CDEM.

11. The digital protection system of claim 10, wherein, when at least one of the first NO contact and the second NO contact is closed and at least one of the third NO contact and the fourth NO contact is closed, power is supplied from the MG set to the CEDM.

12. The digital protection system of claim 10, wherein, when both the first NO contact and the second NO contact are open or both the third NO contact and the fourth NO contact are open, power supplied from the MG set to the CEDM is interrupted.

13. The digital protection system of claim 10,
wherein the first initiation circuit further includes:
a first series circuit for controlling the first NO contact according to an output signal from the concurrent logic controller; and
a first parallel circuit for controlling the second NO contact according to the output signal from the concurrent logic controller, and
wherein the second initiation circuit further includes:
a second parallel circuit for controlling the third NO contact according to the output signal from the concurrent logic controller; and
a second series circuit for controlling the fourth NO contact according to the output signal from the concurrent logic controller.

14. The digital protection system of claim 13, wherein the first series circuit and the first parallel circuit receive the output signals from the first concurrent logic controller and the second concurrent logic controller included in a first train of the at least two trains as inputs.

15. The digital protection system of claim 14, wherein the second series circuit and the second parallel circuit receive the output signals from the first concurrent logic controller and the second concurrent logic controller included in a second train of the at least two trains as inputs.

16. The digital protection system of claim 13,
wherein the first initiation circuit further includes a third circuit including a relay for controlling the second NO contact, the relay for controlling the second NO contact being controlled by the first parallel circuit, and
wherein the second initiation circuit further includes a fourth circuit including a relay for controlling the third NO contact, the relay for controlling the third NO contact being controlled by the first parallel circuit.

17. The digital protection system of claim 16, wherein the relays included in the third circuit and the fourth circuit are normally closed (NC) contacts.

18. The digital protection system of claim 13,
wherein the first series circuit or the second series circuit includes two relays connected in series, the two series relays being respectively turned on/off according to the output signal from the concurrent logic controller, and
wherein the first NO contact or the fourth NO contact is closed when the two relays are both on, and the first NO contact or the fourth NO contact is open when at least one of the two relays is off.

19. The digital protection system of claim 16,
wherein the first parallel circuit or the second parallel circuit includes two relays connected in parallel, the two parallel relays being turned on/off according to the output signal from the concurrent logic controller,
wherein the relay included in the third circuit or the fourth circuit is turned on when the relays included in the first parallel circuit or the second parallel circuit are all off, and
wherein the relays included in the third circuit or the fourth circuit are turned off when at least one of the relays included in the first parallel circuit or the second parallel circuit is on.

20. The digital protection system of claim 1,
wherein the at least one RTB of the RTSS includes a first pair of RTBs controlled by the first initiation circuit and a second pair of RTBs controlled by the second initiation circuit, and
wherein the first pair of RTBs is disposed between the supply of power and a central node of the RTSS, and the second pair of RTBs is disposed between the central node of the RTSS and the CEDM.

* * * * *